United States Patent
Agadi

(10) Patent No.: US 9,157,541 B2
(45) Date of Patent: Oct. 13, 2015

(54) VALVE APPARATUS

(75) Inventor: Harish Agadi, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 0 days.

(21) Appl. No.: 13/612,075

(22) Filed: Sep. 12, 2012

(65) Prior Publication Data

US 2013/0001459 A1 Jan. 3, 2013

Related U.S. Application Data

(62) Division of application No. 12/605,473, filed on Oct. 26, 2009.

(30) Foreign Application Priority Data

Nov. 19, 2008 (GB) .................................. 0821151.8

(51) Int. Cl.
- *F16K 51/00* (2006.01)
- *F16K 24/00* (2006.01)
- *F16K 27/07* (2006.01)
- *B64D 37/00* (2006.01)

(52) U.S. Cl.
CPC ................. *F16K 24/00* (2013.01); *F16K 27/07* (2013.01); *B64D 37/005* (2013.01); *Y10T 137/5109* (2015.04)

(58) Field of Classification Search
CPC ....................................................... F16K 27/07
USPC ................... 251/144, 153, 155, 143; 184/1.5; 137/269
See application file for complete search history.

(56) References Cited

U.S. PATENT DOCUMENTS

| | | | | |
|---|---|---|---|---|
| 2,009,093 A * | 7/1935 | Morehead | ...................... | 251/144 |
| 2,069,588 A * | 2/1937 | Mattimore | ..................... | 251/144 |
| 2,570,909 A * | 10/1951 | Benson et al. | ................. | 251/144 |
| 3,698,420 A * | 10/1972 | Grundy et al. | ........... | 137/329.06 |
| 3,703,189 A * | 11/1972 | Koller | ....................... | 137/329.06 |
| 4,313,591 A * | 2/1982 | Wempe et al. | ................. | 251/144 |
| 4,437,487 A * | 3/1984 | Marmon | ........................ | 137/322 |
| 5,103,856 A * | 4/1992 | Fleischmann | .................. | 137/218 |
| 8,267,630 B2 * | 9/2012 | Moon et al. | .................... | 411/338 |
| 2007/0102450 A1 * | 5/2007 | Stiers | ......................... | 222/181.1 |

FOREIGN PATENT DOCUMENTS

| | | |
|---|---|---|
| GB | 2177773 | 1/1987 |
| GB | 2266050 | 10/1993 |
| GB | 2380771 | 4/2003 |

OTHER PUBLICATIONS

GB Search Report dated Feb. 22, 2009.
GB Search Report dated Mar. 17, 2009.

* cited by examiner

*Primary Examiner* — Kevin Murphy
*Assistant Examiner* — R. K. Arundale
(74) *Attorney, Agent, or Firm* — Hauptman Ham, LLP

(57) ABSTRACT

Valve apparatus for converting a direct water drain valve into an indirect water drain valve, the direct water drain valve having at least one drain conduit, the apparatus including: a part having an inner volume and a fluid transfer aperture for fluid to enter the inner volume, the part being arranged to be connected, directly or indirectly, to the direct water drain valve so as to convert at least some of the inner volume into a substantially fluid-tight passageway between the fluid transfer aperture and the at least one drain conduit of the direct water drain valve.

2 Claims, 6 Drawing Sheets

VALVE APPARATUS

CROSS REFERENCE TO RELATED APPLICATIONS

The present application is a divisional of U.S. application Ser. No. 12/605,473, filed Oct. 26, 2009 and is based on, and claims priority from, British Application Number 0821151.8, filed Nov. 19, 2008, the disclosure of which is hereby incorporated by reference herein in its entirety.

BACKGROUND OF THE INVENTION

Vehicles such as aeroplanes require fuel tanks to store fuel for use in the vehicle's propulsion system. A known problem that can occur in an aircraft's fuel tank is that water builds up in the tank. For example, water vapour may enter a vent of a fuel tank and as the altitude of the aircraft increases and the temperature decreases the water vapour condenses within the tank and, due to water being denser than aviation fuel, settles at the bottom of the tank.

A known way of removing water from a fuel tank is to provide one or more valves to enable water to be drained from the tank upon activation of a valve. Different types of valve are used for this purpose. A direct drain valve drains water from an area adjacent the valve. An indirect drain valve includes a tube or duct, one end of which is connected to the valve conduit and the other is positioned at a remote location, such that water from the remote location can be drawn through the indirect drain valve. These two types of valve are structurally different to one another.

It is desirable to place a water drain valve at the lowest area or areas of the fuel tank. Where it is possible to do so, a direct water drain valve will generally be provided. However, where it is not possible to do so, for example because there is insufficient room to place a valve or from a structural perspective it is not desirable to cut a hole in the tank for a valve at that position, as may be the case with aircraft wings, an indirect water drain valve will be provided in the near vicinity and a tube will connect the indirect water drain valve to the drainage area. Thus, it will be appreciated that in some cases it is necessary to use two different types of valve within a single aircraft, or even within a single fuel tank.

Furthermore, it will be appreciated that a fuel tank can be made from a number of different materials. In order to provide a valve in the body of a fuel tank, the outer surface of the fuel tank generally has a recess formed in it. The recess corresponds in shape to a flange around the base of a valve. In some cases, to prevent rotation of the valve relative to the body, a hole will be drilled in a face of the recess for receiving a corresponding projection on the valve. For some materials, such as metal, it is relatively simple to form the hole within the recessed part for receiving the projection. However, when a fuel tank is made of a material such as carbon composite it can be difficult to machine the hole due to the size thereof.

SUMMARY OF THE INVENTION

According to a first aspect of the present invention, there is provided valve apparatus for converting a direct water drain valve into an indirect water drain valve, the direct water drain valve having at least one drain conduit, the valve apparatus including a first element having an inner volume and a fluid transfer aperture for fluid to enter the inner volume, the valve apparatus being arranged to be coupled to the direct water drain valve such that at least some of the inner volume forms a substantially fluid-tight passageway between the fluid transfer aperture and the at least one drain conduit of the direct water drain valve. Therefore the valve apparatus according to the first aspect of the invention enables an existing direct drain valve to be converted into an indirect drain valve. The apparatus includes a first element and is arranged to be coupled to the existing direct drain valve body so as to create a substantially fluid tight passage way between a fluid transfer aperture through the first element and a drain conduit of the valve. The passageway includes at least some of the inner volume of the first element. Thus, because a substantially fluid tight passage way is formed between the fluid transfer aperture and drain conduit, any fluid entering the inner volume of the first element through the fluid transfer aperture can be drawn or forced to exit the valve through the drain conduit.

The apparatus may further include a connector for fixing the direct water drain valve to a structure, the connector being arranged to interface with the first element in a substantially fluid tight manner. Thus the connector which may be used to connect the valve body to a fuel tank can also be used to create a seal between the first element and the drain conduit. The connector may comprise a threaded nut having a slot in an axial face arranged to receive a portion of the first element in a fluid-tight configuration.

The valve apparatus may further include a seal arranged to provide a substantially fluid-tight seal between the fluid transfer aperture and an external duct. Thus fluid located adjacent the exterior of the first element can, in some embodiments, be prevented from entering the inner volume by locating a tube in the fluid transfer aperture of the first element.

The fluid transfer aperture may be provided through a side wall of the first element. This results in less pressure needing to be applied to a fluid, from above, to force it up to a height whereby it can enter the fluid transfer aperture.

The valve apparatus may include orientation means for controlling the orientation of the first element relative to the valve body. This enables the first element to be set in a particular orientation and the orientation means limits further rotation of the first element relative to the valve body. The orientation means may comprise an interlock or a friction inducing member between the first element and valve.

The first element may be a cap arranged to substantially enclose at least a closest opening of the at least one drain conduit. This has the advantage of enabling a closest opening of the at least one drain conduit to be enclosed by the cap and thus limit fluid entering the cap via the fluid transfer aperture from mixing with fluid from outside the cap.

According to a second aspect of the present invention, there is provided a water drain valve for enabling fluid to be drained from a fluid containing vessel, the valve including: a body arranged to extend through an outer wall of a fluid containing vessel the body having a conduit for providing an outlet from the fluid vessel; and valve apparatus including a first element having a fluid volume and a fluid transfer aperture for fluid to enter the fluid volume and being arranged to be coupled to the valve body such that at least some of the inner volume forms a substantially fluid-tight passageway between the fluid transfer aperture and the conduit. Therefore the water drain valve according to the second aspect of the invention provides an indirect drain valve including valve apparatus arranged to be coupled to a direct drain valve body. Due to the substantially fluid tight passage way that is created between the fluid transfer aperture and drain conduit, any fluid entering the inner volume of the part through the fluid transfer aperture can be drawn or forced to exit the valve through the drain conduit.

The valve apparatus may further comprise a connector for fixing the valve body to the outer wall of the fluid containing vessel, the connector being arranged to interface with the first element in a substantially fluid-tight manner. Thus the connector which may be used to connect the valve body to a fuel tank can also be used to create a seal between the first element and the drain conduit. The connector may include a threaded nut for securing the body to the dividing structure, the threaded nut having a slot or groove in an axial face thereof arranged to receive a portion of the first element in a fluid-tight configuration.

The first element may be configured such that the fluid transfer aperture is adjacent a general plane of the outer wall of the fluid containing vessel. This results in less pressure needing to be applied to a fluid, from above, to force it up to a height whereby it can enter the fluid transfer aperture.

The first element may be removably connectable to another part of the valve.

The valve body may include a non-circular or non-disc-shaped radial flange arranged to limit rotation between the body and the outer wall of the fluid containing vessel. Thus, the shape of the flange can prevent rotation between the valve body and, for example, a fuel tank body. The flange is oval in shape when viewed sectionally through a plane parallel to a general plane of the dividing structure at the location where the valve body is arranged to be provided. Thus, a corresponding recess in an outside face of, for example, a fuel tank body does not contain sharp features due to the oval shape of the flange.

The first element may be attachable to another part of the water drain valve in one of a plurality of orientations and a rotation limiter is provided to limit rotation therebetween. This enables the first element to be set in a particular orientation and the rotation limiter limits further rotation of the first element relative to the valve body.

The first element may be a cap arranged to substantially enclose an opening of the at least one drain conduit. This has the advantage of enabling an opening of the at least one drain conduit to be enclosed by the cap and thus prevent fluid entering the cap via the fluid transfer aperture from mixing with fluid from outside the cap.

According to a third aspect of the present invention, there is provided device arranged to be attached to a structure, the structure having a recess formed in a surface thereof providing a recessed surface, and an aperture formed through the recessed surface, the device including a body arranged to be received in the aperture and a non-circular flange arranged to be received in the recess such that the non-circular configuration of the flange in combination with the recess limits rotation between the device and the structure. Thus the device cannot rotate freely about the structure because the flange is non-circular and rotation causes a part of the flange to contact a sidewall of the recess so as to prevent further rotation in that direction. Part of the perimeter of the flange is located further from the longitudinal axis of the body than another part. Thus, providing the recess has a perimeter wall having at least one part which is at a distance, from the longitudinal axis of the body, greater than the shortest distance between the longitudinal axis of the body and the flange and less than the largest distance between the longitudinal axis of the body and the flange, it will result in rotation of the device being restricted. The flange may have an oval shaped perimeter.

The device may comprise a water drain valve according to any of claims 9 to 17.

BRIEF DESCRIPTION OF THE DRAWINGS

Embodiments of the present invention will now be described, by way of example only, with reference to the accompanying drawings, in which:

FIG. 2b shows a plan view of the valve of FIG. 2a;

FIG. 3b shows a perspective view of the underneath of the valve apparatus of FIG. 3a;

DETAILED DESCRIPTION OF EMBODIMENTS OF THE INVENTION

Figure 1A:
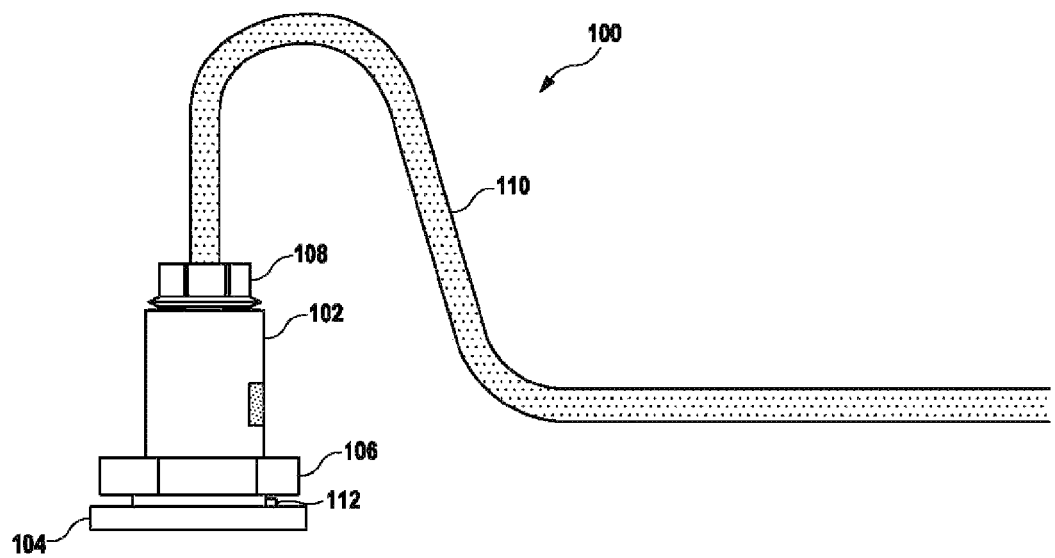
FIG. 1a shows a side view of a known indirect water drain valve.
Figure 1B:
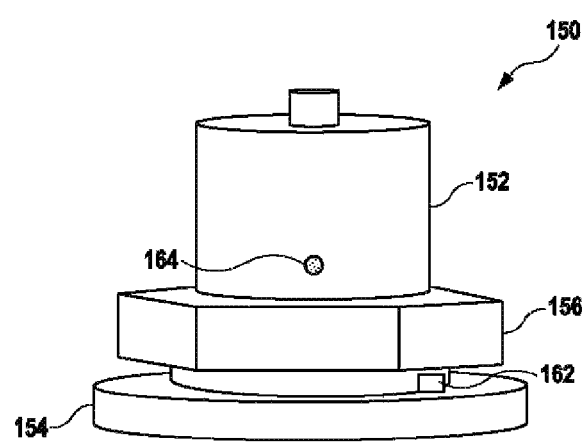
FIG. 1b shows a side elevated view of a known direct water drain valve.

Referring to FIGS. 1a and 1b, two types of known clamped-type valves are shown. FIG. 1a shows a side view of an indirect water drain valve. It is called an indirect water drain valve because the water to be drained is drawn through a tube 110 from a remote location. The indirect water drain valve 100 comprises a generally cylindrical body 102 having a flange 104 disposed at a first end thereof and a threaded neck at an opposing second end to which a nut 108 may be attached to connect the tube 110 to the second end of the body 102. The valve 100 further includes a larger nut 106 arranged to engage with a threaded lower area of the body 102.

In use, the body 102 is pushed through a hole in a face of the fuel tank, corresponding in size and shape to the circumference of the body 102, until the flange 104 is received within a corresponding recess formed in the outer face of the fuel tank at a location corresponding to the hole. A projection 112 on the flange lies within a corresponding hole in the recessed area of the fuel tank to prevent rotation of the body relative to the tank. The nut 106 may then be passed over the second end of the body 102 and engaged with the threaded part of the body, so as to retain the valve 100 against the fuel tank. The tube 110 may then be attached the second end of the body 102 using nut 108.

When a user, such as an aeroplane maintenance engineer, wishes to drain fuel from the area at the free opening of the tube 110 the valve mechanism is operated to open the valve and the pressure applied to the water by the aviation fuel that lays on top of the layer of water causes the water to exit the tank through the tube 110 and out through a conduit within the valve 100. The internal valve mechanism (not shown) comprises a conduit between the first end and second end which is blocked when the valve is in a closed configuration. The valve may be moved to an open configuration by pressing an actuator and in this state water may pass from the pipe 110 to the outside of the fuel tank. For water to be drainable from the fuel tank, via the open valve, the fuel tank must generally contain a reasonable amount of aviation fuel. The weight of the aviation fuel above the layer of water applies downward pressure to the layer of water to cause the water to be forced to exit via the open valve. It will be understood that the configuration of the fuel tank and the position of the indirect water drain valve within the tank affects how much fuel the fuel tank must contain to enable water to be drained from it. In some cases, it may be necessary for a fuel tank to contain several hundred liters of fuel to provide pressure on a layer of water thereunder such that the water can be drained through an indirect water drain valve.

FIG. 1b shows a direct water drain valve. It is known as a direct water drain valve because it drains water from an area adjacent the valve, without the requirement for a tube. The direct water drain valve 150 comprises a generally cylindrical body 152 having a drain hole 164 for providing passageway for water in the tank to exit the tank when the valve is operated. As with the indirect drain valve 100, the direct drain valve 150 includes a flange 154 having a projection 162 and a nut 156 for securing the valve to the fuel tank base.

Figure 2A:
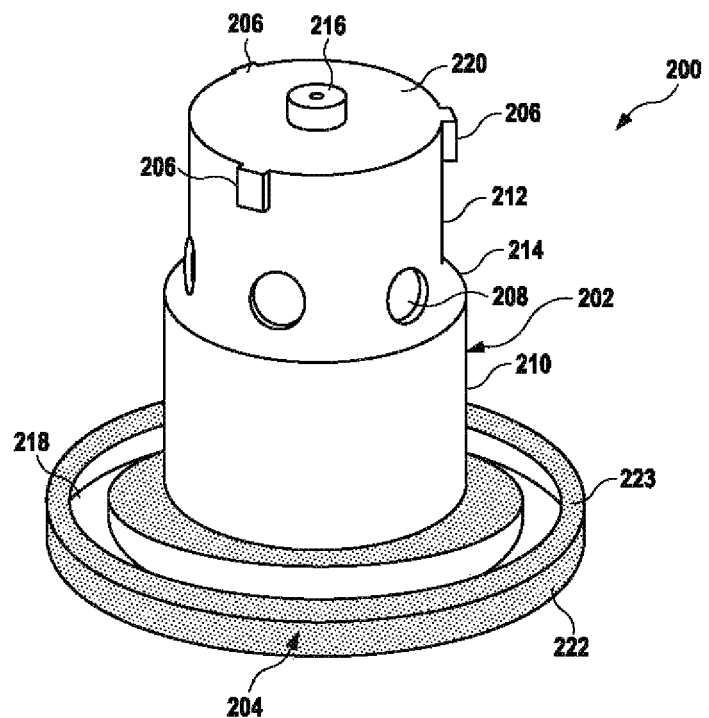
FIG. 2a shows a perspective view of a direct water drain valve according to an embodiment of the invention.

FIG. 2a shows a direct water drain valve 200 according to an embodiment of the present invention. In this example the valve 200 is a clamped-type valve but may in other embodiments be another type of valve, such as a bolted-type valve. The direct water drain valve 200 comprises a generally cylindrical body 202 having an upper circumferential wall 212 connected to a lower circumferential wall 210 by a shoulder portion 214. The lower circumferential wall has a larger diameter than the upper circumferential wall and has a threaded area (not shown) at an area adjacent the shoulder 214. However, it will be appreciated that the valve body 202 need not include the shoulder and different diameter body portions. The valve body 202 can be of any suitable shape, for example cylindrical, rectangular, triangular or the like. When the body has a plurality of sides it is preferable that the areas where the side meet, i.e. corners, have rounded edges such that the corresponding hole in the fuel tank body does not have sharp corners/edges. It will be appreciated that if the body is non-cylindrical, it is possible to have a cylindrical flange as the body itself will oppose rotation thereof relative to the fuel tank.

One or more drain apertures 208 are formed through the valve body 202 to provide fluid communication between an internal conduit (not shown) an area outside the valve body 202. In the illustrated embodiment there is a plurality of drain apertures 208 and these are provided through the upper circumferential wall 212 at a lower part thereof, adjacent the shoulder 214. A part of a valve aperture is formed through the curved exterior of the shoulder 214, such that, in use, the lowest part of valve aperture is substantially level with the top of the lower circumferential wall. However, in other embodiments the valve aperture(s) 208 may be provided at different locations on the valve body, as will be apparent to one skilled in the art.

The valve body 202 has a first end defined by the distal end of the upper circumferential wall relative to the shoulder and a second end defining a circumferential flange 204. The flange 204 has a peripheral wall 222 and a circular groove 218 formed into the upper axial surface 223. The groove 223 is arranged to receive an O-ring sealing element to provide a seal between the upper axial face 223 and the opposing recessed face of a fuel tank. It will be appreciated that in some embodiments the flange 204 may be a solid portion not having the groove 223. The valve body 202, in the illustrated embodiment, terminates at the first end with a top face 220 from which extends a concentric boss 216. The boss 216 includes a concentric hole which in combination with the boss 216 provides a means by which a cap can be attached to the valve body 202 by a mechanical fixing means, such as a screw. In some embodiments the boss 216 and hole are not provided.

In the illustrated embodiment a plurality of projections 206 are provided that project radially from the upper circumferential wall 210 near the top face 220. The projections 206 provided on the outer face of the valve body 202 are arranged to restrict the rotation of a cap relative to the body 202. In some embodiments, the projections prevent such rotation by mating with one or more corresponding projections provided on a cap. It should be noted that in other embodiments the valve body 202 does not include projections 206.

The valve 200 has an internal conduit, a first end of which connects to the drain apertures 208 and a second end of which opens on to the end of the flange. A valve mechanism is provided in some embodiments which is operable to change the valve from a closed configuration in which the conduit is blocked to a drain configuration in which the conduit is open and thus any liquid entering a drain aperture 208 may pass through the conduit and exit through the second end of the conduit and thus exit the fuel tank.

Figure 2B:
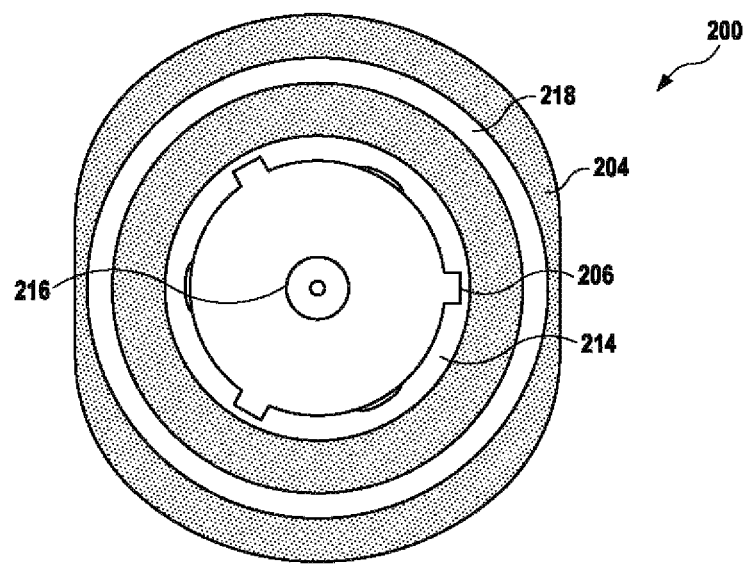

FIG. 2b shows a plan view of the direct water drain valve of FIG. 2a. As can be seen, the peripheral wall 222 of the flange 204 is further from the longitudinal axis of the body at some places than at others. In the illustrated embodiment, the flange 204 is oval in shape. However, in other embodiments the flange can be other non-circular shapes, preferably devoid of sharp features, so as to resist relative rotation between the body and the base of a fuel tank. For example the flange could be hexagonal in shape. If the peripheral wall 222 is devoid of sharp features it means that it is easier to form the corresponding recess in the fuel tank body, which may be formed of composite material which is difficult to form sharp features in.

The boss 216 comprises a disc shaped projection positioned concentric with respect to the longitudinal axis of the body 202. The projections 206 provided on the outer face of the valve body 202 are in the illustrated embodiment provided at equidistant positions around the circumference of the upper circumferential wall 212. The valve body 202 may be formed of a plastics material, such as PTFE, or any other suitable material that is light-weight and non-ferrous, such as Aluminium or a Titanium alloy.

Figure 2C:
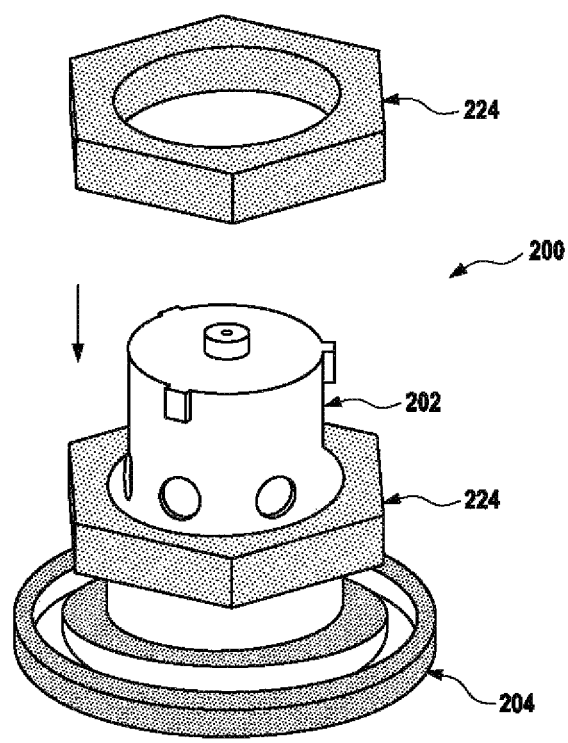
FIG. 2c shows a perspective view of the valve of FIG. 2a showing a nut being connected to the valve body.

The direct water drain valve 200 is arranged to be secured, in a fluid tight manner, to a surface such as a base of a fuel tank. The fuel tank has an aperture formed or cut of corresponding dimensions to the lower circumferential wall 210 of the valve body 202. Furthermore, a recess is formed or provided on the outside face of the fuel tank. The recess corresponding in size and shape to the flange 204 such that the flange can be received in the recess. Preferably, the flange is received in the recess so as to be in registration with the outside surface of the fuel tank adjacent the recess. It is not necessary to provide a projection to prevent rotation between the valve body and the fuel tank because the non-circular nature of the flange prevents such rotation. With the direct water drain valve 200 pushed through the aperture in the fuel tank such that the flange 204 is received within the recess, a nut 224 can be passed over the first end of the body 202 and the nut rotated such that its thread engages with the threaded part of the lower circumferential wall 210 of the body 202. The nut 224 may be rotated until one of its axial faces presses against the upper face of the base of the fuel tank. It will be appreciated that the combination of nut 224 and threaded part of the lower circumferential wall 210 of the body 202 enables the valve 200 to be fitted to structures of a range of thicknesses. The length of the threaded part in the axial direction of the circumferential wall 210 provides flexibility as to how far along the length of the threaded part the nut 224 needs to travel to contact a face of the structure, so as to secure the valve 200 to the structure. In the illustrated embodiment, as shown in FIG. 2c, once the nut is fully tightened the upper axial face of the nut is in registration with the shoulder 214 of the body. Whilst in this embodiment a nut 224 is used to secure the body 202 to the fuel tank, the skilled person will be able to envisage other suitable ways of attaching the valve body 202 to a fuel tank in a fluid-tight manner, such as bonding.

In use, should a layer of water collect at the bottom of the fuel tank within which the valve 200 is disposed, a serviceman may operate the valve mechanism to "open" the valve and upon doing so the collected water passes through drain apertures 208 through the internal conduit and exit the valve on the outside of the fuel tank. A serviceman may continue to hold the valve until fuel begins to flow from the valve at which time the valve may be closed.

Figure 3A:
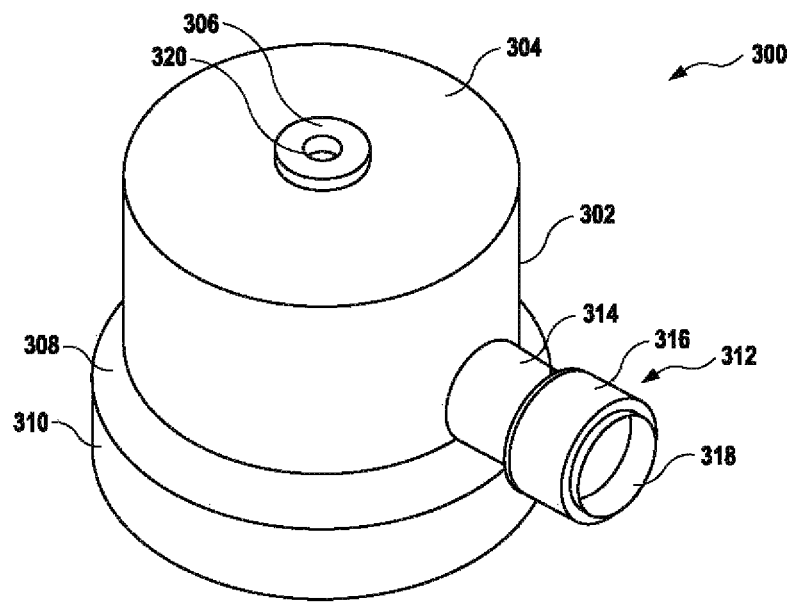
FIG. 3a shows a perspective view of valve apparatus according to an embodiment of the invention.
Figure 3B:
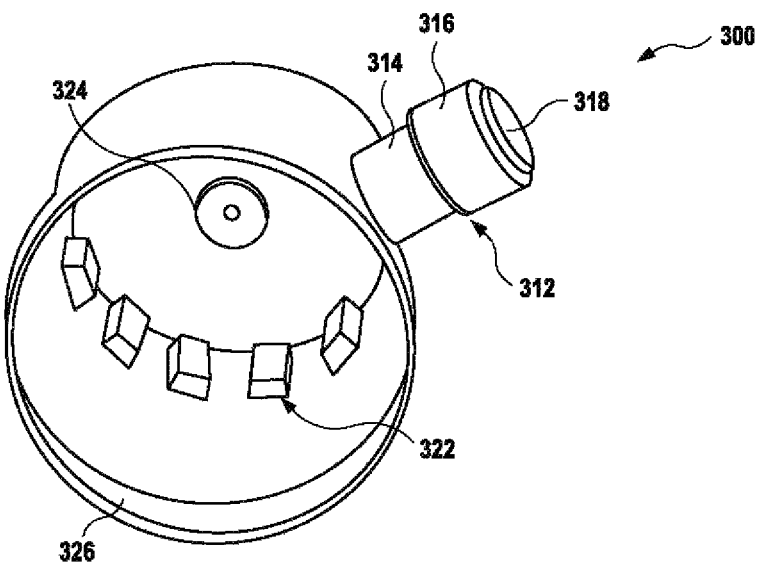
Figure 4:
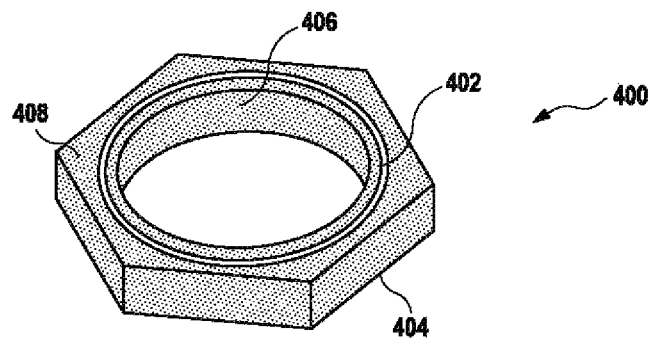
FIG. 4 shows a part of the valve apparatus according to an embodiment of the present invention.

Referring to FIGS. 3a to 4, valve apparatus according to an embodiment of the invention is shown for converting a direct water 200 drain valve into an indirect water drain valve. Valve apparatus includes a first element having an inner volume and a fluid transfer aperture for fluid to enter the inner volume, the valve apparatus being arranged to be coupled to the direct water drain valve such that at least some of the inner volume forms a substantially fluid-tight passageway between the fluid transfer aperture and the at least one drain conduit of the direct water drain valve.

The first element in the illustrated embodiment comprises a cap 300. The cap 300 includes a generally cylindrical sidewall 302 closed at one end by a top face 304 and open at its second end. The second end of the sidewall 302 defines a shoulder portion 308 from which extends a skirt 310. The skirt 310 has a larger diameter than the sidewall 302. It will be appreciated that the cap 300 can other types of side wall or side walls, such as a straight side wall.

A fluid transfer aperture is formed through the sidewall 302 and is in this embodiment surrounded by a spout 312 comprising a proximal pipe integrally formed with a distal pipe of relatively larger diameter. The distal pipe 316 defines an opening 318 in fluid communication with the fluid transfer aperture. In other embodiments the spout 312 is composed of a straight pipe, which would be suitable for attachment to a rubber pipe capable of radial distension, the pipe possibly having a ridged outer circumferential area for retaining a tube thereon. In another embodiment the cap 300 does not include a spout 312 and the fluid transfer aperture is arranged to retain a tube in a sealed manner. For example, the fluid transfer aperture can be interfaced with a tube of larger diameter capable of radial distension so as to expand and fill the fluid transfer aperture.

In some embodiments, a connection aperture 320 may be formed through the top surface for a screw or other fixing means to pass through to secure the cap to a direct drain valve. In some cases, the connection aperture 320 may be surrounded by a strengthening ring 306, the function of which will be apparent. It will be appreciated that whilst the connection aperture 320 is advantageous if the cap 300 is to be connected to the valve body 202 using, for example, a screw, in other embodiments the cap 300 does not include a connection aperture 320 or strengthening ring 306.

The cap may be formed of a plastics material, such as HDPE or any other suitable material that is light-weight and non-ferrous, such as Aluminium or a Titanium alloy.

FIG. 3b shows the inside of the cap 300. The cap 300 has an inner volume. In some embodiments, one or more projections 322 are provided around the inner circumferential wall of the cap so as to correspond to the projections 206 provided on the outer face of the valve body 202 such that the two sets of projections 206, 322 mate and form a rotation limiter to limit rotation therebetween. When the cap 300 is connected to the valve body 202 via a suitable connection means, the projections 206 provided on the outer face of the valve body 202 and projections 322 provided on the inner face of the cap 300 engage to limit the amount that the cap 300 can rotate relative to the body 202. This enables the cap to be placed upon the direct water drain valve in one of a number of particular orientations and prevent further substantial rotation therebetween. It will be apparent that this enables the spout 312 to be set to a particular orientation, such as a facing towards a remote area which it is desirable to drain. Whilst the illustrated embodiment includes projections 206 provided on the outer face of the valve body 202 to form an interlock with projections 322 provided on the inner face of the cap 300 it will be noted that there are other ways for controlling the orientation of the cap relative to the valve body. An example is a friction inducing member which could be a material provided between the valve body and the cap or could be provided by the relative dimensions i.e. the cap being of similar or fractionally smaller diameter than the valve body. In some embodiments the projections 322 and provided at a different location on the cap 300 and in other embodiments the cap 300 does not include the projections 322.

FIG. 4 shows means by which the cap 300 may be connected to the valve body 202 according to an embodiment of the present invention. A slotted nut 400 has peripheral faces 404, a threaded inside face 406 and a cylindrical groove 402 formed through a first axial face 408 thereof. The nut 400 may have a second groove (not shown) in the opposing axial face to the groove 402. The second groove is arranged to receive a sealing ring for providing a substantially fluid-tight seal between the respective face of the nut 400 and an inside surface of a fuel tank wall. The purpose of the slotted nut 400 is to interface with the cap 300 such that a fluid-tight passageway is formed between the fluid transfer aperture 313 in the cap 300 and the conduit in the valve 200. Whilst this is an advantageous embodiment, due in part to the fact that it makes use of an already exiting part (the nut) which is used to connect the valve body 202 to the fuel tank, in other embodiments different means are provided by which a fluid-tight passageway is formed between the fluid transfer aperture 313 in the cap 300 and the conduit in the valve 200. For example, the cap 300 could have an inwardly extending skirt having an inner diameter which is smaller than the outer diameter of the valve body, such that the inwardly extending skirt could be forced over the valve body, thereby creating a substantially fluid-tight seal between them. In another embodiment, the open end of the cap 300 is elastic and cab be distended and placed over the valve body 202. When released, the cap 300 contracts to form a sealing connection between itself and the wall of the valve body 202. In another embodiment the cap may be arranged to be bonded to the valve body, for example by glue.

Figure 5:
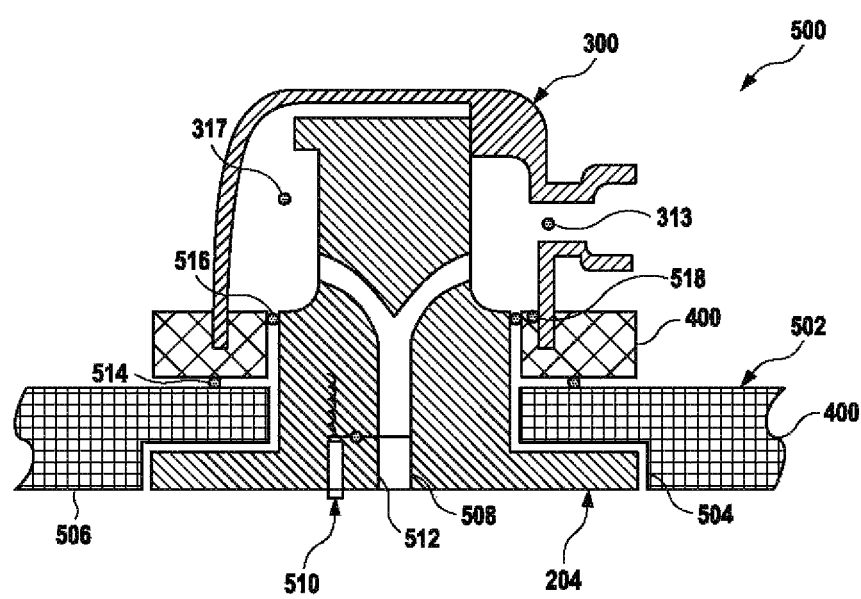
FIG. 5 is a cross-sectional view of an indirect water drain valve according to an embodiment of the invention connected to a fuel tank base.

FIG. 5 shows an indirect water drain valve interfaced with a fuel tank wall 502. The wall 502 will typically be a base wall. The indirect water drain valve 500 has been secured to the base of the fuel tank 502 in a similar manner to that described above for connection of a direct water drain valve 200. However, rather than a standard nut, a slotted nut 400 is used to secure the valve body to the base of the fuel tank 504. As can be seen, the flange 204 of the valve body 202 is within the corresponding recess 502 formed through the outside surface 506 of the fuel tank base 502 and in registration therewith. By placing the cap 300 over the part of the valve body projecting through the base of the tank 502 into the inside of the tank, a seal is formed by the side wall 302 of the cap 300 being received within the slot 402 and this seal contributes to a substantially fluid tight passageway between the fluid transfer aperture 313 and the conduit 508 within the valve body. A pipe or duct (not shown) may have a first end connected to the spout and a second end located at an area that is desirable to drain water from. In some embodiments the cap has a plurality of fluid transfer apertures 313, with or without spouts.

The fluid transfer aperture 313 is provided through the sidewall 302 of the cap 300. In the illustrated embodiment the fluid transfer aperture 313 is approximately mid way up the sidewall 302. However, in other embodiments the fluid transfer aperture may be provided below the halfway point of the cap and in a preferred embodiment it is located adjacent to the slotted nut 400. The skilled person will appreciate that, generally, the closer a fluid transfer aperture and spout 312 are to the top surface of the base 502, the less pressure is required to transfer fluid, such as water, from the tank to the fluid transfer aperture 313. Consequently, by providing the fluid transfer aperture on the sidewall of the cap, rather than for example on the top surface of the cap, water can be drained from the tank with less aviation fuel in the tank than is possible using prior art indirect drain valves. The indirect water drain valve according to some embodiments of the present invention results in water being drainable from a fuel tank with 50% less fuel in it, compared to some prior art indirect water drain valves. Preferably, the fluid transfer aperture is provided between the flange 204 and halfway between the flange 204 and the first end of the valve body 202. In one embodiment, the cap is configured such that the fluid transfer aperture is adjacent a general plane of the dividing structure.

In use, a user may operate the valve mechanism 510 to open the valve member within the conduit 508, thereby allowing water to pass to the outlet 512. The pressure acting on the top surface of the water at the bottom of the fuel tank by aviation fuel above it causes water to move from the drainage area through the duct (not shown) and through the fluid transfer aperture 313, into conduit 508 and out via outlet 512. Once the water has been drained from the tank the valve mechanism 510 is operated to close the valve by sealing conduit 508. The cap 300 and means by which it is sealed to the valve body 202 provide a watertight passageway between the conduit and fluid transfer aperture meaning that substantially no fluid from an area adjacent and outside the cap 300 can exit via the conduit and also any fluid, such as water, entering the fluid volume 317 cannot escape to mix with fluid adjacent and outside the cap 300.

In some embodiments a seal 518 is provided between the skirt 310 and slot 402 and/or a seal 514 is provided between the slotted nut 400 and base of the fuel tank 502. The seal 518 between the skirt and the slot may be a fillet seal or other suitable sealing means. In some embodiments a seal 516 is provided between the slotted nut 400 and valve body.

Therefore the valve apparatus 300 according to a further embodiment of the present invention enables an existing direct drain valve 200 to be converted into an indirect drain valve. The apparatus includes a first element 300 and is arranged to be coupled to the existing direct drain valve body 202 so as to create a substantially fluid tight passage way between a fluid transfer aperture 313 through the first element and a drain conduit 508 of the valve. The passageway includes at least some of the inner volume of the first element 300. Thus, because a substantially fluid tight passage way is formed between the fluid transfer aperture 313 and drain conduit 508 of the valve 200, any fluid entering the inner volume of the first element 300 through the fluid transfer aperture 313 can be drawn or forced to exit the valve 200 through the drain conduit 508.

Figure 6A:
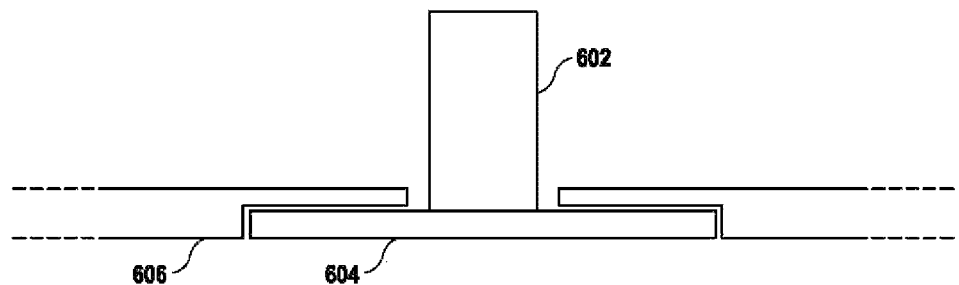
FIGS. 6a to 6c show a front view, side view and plan view, respectively, of a device according to a further embodiment of the invention.
Figure 6B:
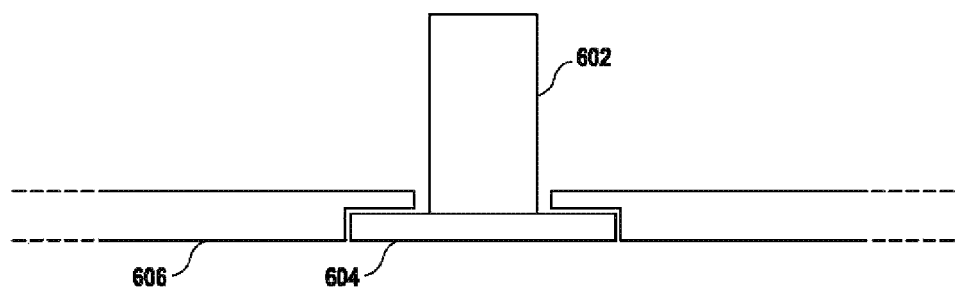
Figure 6C:
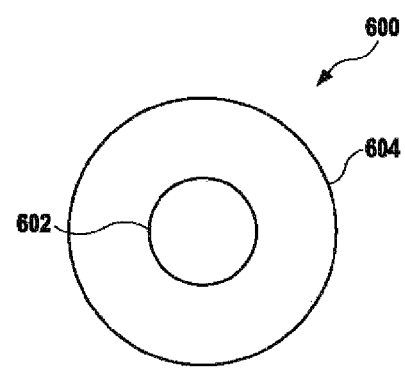

Referring to FIGS. 6a to 6c, a device 600 is shown according to an embodiment of the invention. The device 600 is arranged to be attached to a structure 606, such as a wall of a fuel tank. The device 600 may be a water drain valve, or other component, which is arranged to be fixed to a structure with a limited amount of freedom to rotate about the structure 606. In some embodiments, the device 600 is a direct water drain valve according to an embodiment of the invention as described above. The device 600 includes a generally cylindrical body 602 a first end of which is arranged to pass through a corresponding aperture in the structure 606 to which the device 600 is to be attached. A second end of the body 602 defines or is connected to a flange 604. The flange 604 projects radially from the second end of the body 602. The flange 604 has generally planar axial faces and a peripheral wall. When viewed from a plane parallel to a planar axial face, as shown in FIG. 6c, the flange 604 is non-circular i.e. the peripheral wall does not define a circular path. As can be seen, the peripheral wall of the flange 604 is further from the longitudinal axis of the body 602 at some places than at others. In the illustrated embodiment, the flange 604 is oval in shape and has at least one oval shaped face. However, in other embodiments the flange can be other non-circular shapes, preferably devoid of sharp features, so as to resist relative rotation between the body and the base of a fuel tank. For example the flange could be hexagonal in shape. If the peripheral wall is devoid of sharp features it means that it is easier to form the corresponding recess in the fuel tank body, which may be formed of composite material which is difficult to form sharp features in.

The flange is arranged to be received within a corresponding recess formed in a face of the structure 606 to which the device 600 is to be attached. The recess in the structure 606 is coincident with the aperture corresponding to the body 602. The flange is received within the recess such that the axial face of the flange 604 which faces away from the body 602 is in registration with the corresponding face of the structure 606. However, it will be appreciated that other configurations may be appropriate, such as the axial face of the flange 604 which faces away from the body 602 not being in registration with the corresponding face of the structure 606. Due to the flange being non-circular, rotation of the flange 604 and thus the body 602 relative to the structure 606 is limited to that permitted by "play" between the flange and recess.

Thus the device cannot rotate freely about the structure because the flange is non-circular and rotation causes a part of the flange to contact a sidewall of the recess so as to prevent further rotation in that direction. In the illustrated embodiment, part of the perimeter of the flange is located further from the longitudinal axis of the body than another part. Thus, providing the recess has a perimeter wall having at least one part which is at a distance, from the longitudinal axis of the body, greater than the shortest distance between the longitudinal axis of the body and the flange and less than the largest distance between the longitudinal axis of the body and the flange, it will result in rotation of the device being restricted.

It is therefore not necessary to provide a projection or the like to prevent rotation between the device 600 and the structure 606 because the non-circular nature of the flange 604 prevents such rotation. With the body 602 of the device 600 pushed through the corresponding aperture in the structure 606 such that the flange 604 is received within the recess, a nut can be passed over the first end of the body 602 and the nut rotated such that its thread engages with a threaded part of the body 602. Whilst in this embodiment a nut is used to secure the body 602 to the structure 606, the skilled person will be able to envisage other suitable ways of attaching the body 602 to a structure 606 in a fluid-tight manner, such as bonding.

The invention claimed is:

1. A valve apparatus comprising a water drain valve arranged to be attached to an outer wall of a fluid containing vessel, the outer wall of the fluid containing vessel having a recess formed in a surface thereof providing a recessed surface, and an aperture formed through the recessed surface, the water drain valve including a body arranged to be received in the aperture and a non-circular flange of the body arranged to be received in the recess such that the non-circular configuration of the flange in combination with the recess limits rotation between the water drain valve and the outer wall of the fluid containing vessel, wherein the body has a conduit for providing an outlet from the fluid vessel, and wherein the valve apparatus includes a cap having a circumferential sidewall including an inner surface, a closed end, an open end, a fluid volume space and a fluid transfer aperture for fluid to enter the fluid volume space and the open end being configured to encapsulate a portion of the valve body such that at least a portion of the fluid volume space forms a substantially fluid-tight passageway between the fluid transfer aperture and the conduit, the substantially fluid-tight passageway being defined between the inner surface of the cap and an outer surface of the valve body.

2. A valve apparatus according to claim 1, wherein the flange of the water drain valve has an oval shaped perimeter.

\* \* \* \* \*